(12) United States Patent
Tang et al.

(10) Patent No.: US 7,406,071 B1
(45) Date of Patent: Jul. 29, 2008

(54) METHOD AND SYSTEM FOR RESOLVING BETWEEN GEOGRAPHIC INFORMATION AND NETWORK ADDRESSES IN A WIDE AREA NETWORK, PREFERABLY IN THE INTERNET

(75) Inventors: Haitao Tang, Helsinki (FI); Hannu Isto Juhani Flinck, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/181,608

(22) PCT Filed: Jan. 31, 2000

(86) PCT No.: PCT/EP00/00763

§ 371 (c)(1),
(2), (4) Date: Aug. 27, 2002

(87) PCT Pub. No.: WO01/58111

PCT Pub. Date: Aug. 9, 2001

(51) Int. Cl.
*H04L 12/66* (2006.01)
*H04L 12/28* (2006.01)
*G06F 15/16* (2006.01)
*H04Q 7/20* (2006.01)

(52) U.S. Cl. .................. 370/352; 370/408; 370/254; 709/223; 709/229; 455/456.1

(58) Field of Classification Search ............... 709/227, 709/226, 228, 203, 200, 229, 206, 245, 223, 709/217, 219, 225, 204; 455/453, 456.1, 455/456.2, 452.2; 370/395.21, 352, 408, 370/254, 400, 356, 353

See application file for complete search history.

(56) References Cited

U.S. PATENT DOCUMENTS 6,014,090 A    1/2000   Rosen et al. ................. 340/905

(Continued)

OTHER PUBLICATIONS

T. Imielinski J. Navas: "RFC 2009: GPS-Based Addressing and Routing" GPS-Based Addressing and Routing, XX, XX, Nov. 30, 1996, pp. 1-27, XP002131778.

(Continued)

*Primary Examiner*—Hanh Nguyen
(74) *Attorney, Agent, or Firm*—Squire, Sanders & Dempsey L.L.P.

(57) ABSTRACT

The invention provides a GeoIP resolving system (GIRS) which is able to resolve between the IP addresses and the geographic location of servers/hosts/access ports in a wide area network, in particular the internet. GIRS servers are provided which contain resolution tables indicating the correlation between IP addresses and geographic positions of servers/hosts/access ports. The GIRS system can be accessed by indicating a certain geographic area wherein the GIRS system responds by listing all IP addresses of servers/hosts/access ports located in the indicated geographic area. In addition, the service types provided or requested by the found servers/hosts/access ports may be listed. The GIRS system can also be accessed by specifying an IP address. The GIRS system then responds by issuing the geographic coordinates of the location of the host having the indicated IP address and, maybe, the associated service, policy server, as well as administrated area. This adds a geo-based functionality to the internet and therefore increases its usability.

22 Claims, 6 Drawing Sheets

U.S. PATENT DOCUMENTS

| | | | | |
|---|---|---|---|---|
| 6,154,777 | A * | 11/2000 | Ebrahim | 709/227 |
| 6,347,085 | B2 * | 2/2002 | Kelly | 370/352 |
| 6,594,254 | B1 * | 7/2003 | Kelly | 370/352 |
| 6,732,188 | B1 * | 5/2004 | Flockhart et al. | 709/245 |
| 6,757,740 | B1 * | 6/2004 | Parekh et al. | 709/245 |
| 7,012,916 | B2 * | 3/2006 | Low et al. | 370/352 |
| 7,130,818 | B2 * | 10/2006 | Fisher et al. | 705/26 |
| 7,133,664 | B2 * | 11/2006 | Bahl et al. | 455/414.2 |
| 7,280,999 | B2 * | 10/2007 | Chung et al. | 709/227 |

OTHER PUBLICATIONS

Moh M. et al.: "Mobile IP telephony: mobility support of SIP" Proceedings of the International Conference on Computer Communications and Networks, XX, XX, Oct. 11, 1999, pp. 554-559. XP002143545.

* cited by examiner

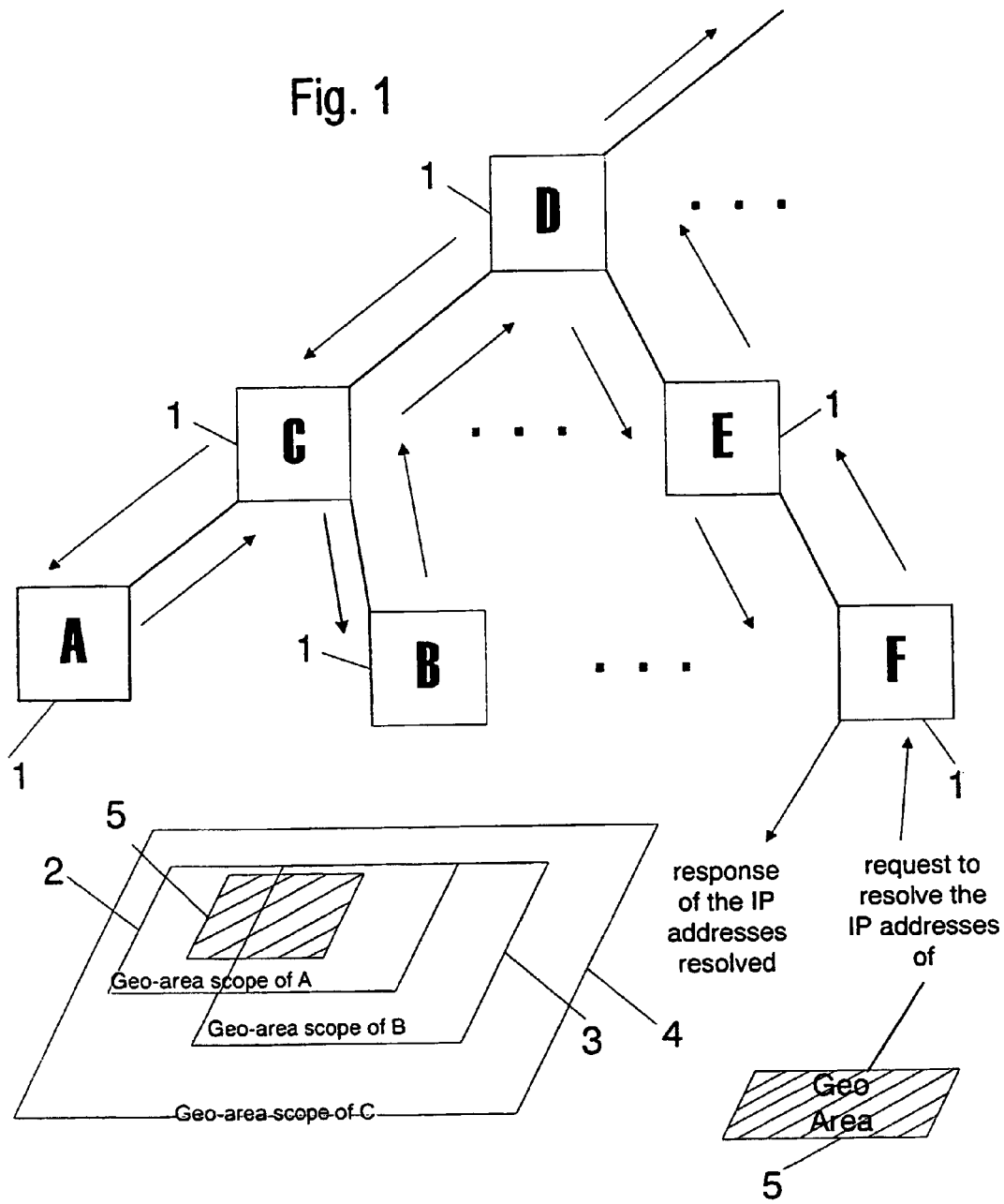

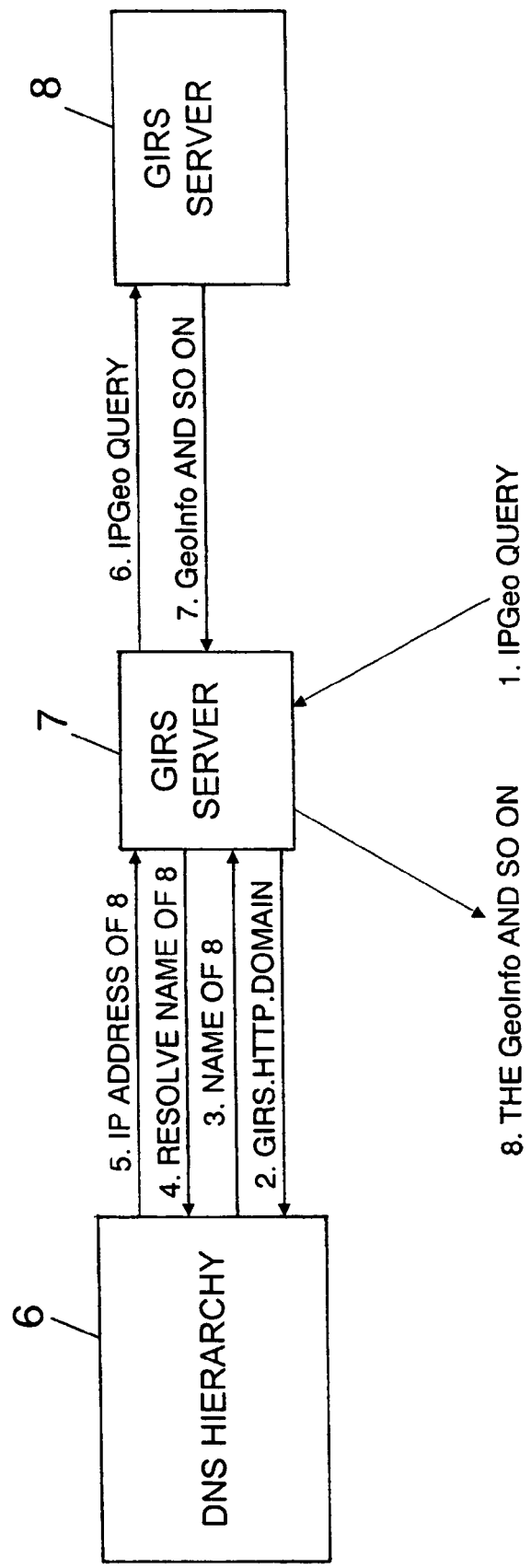

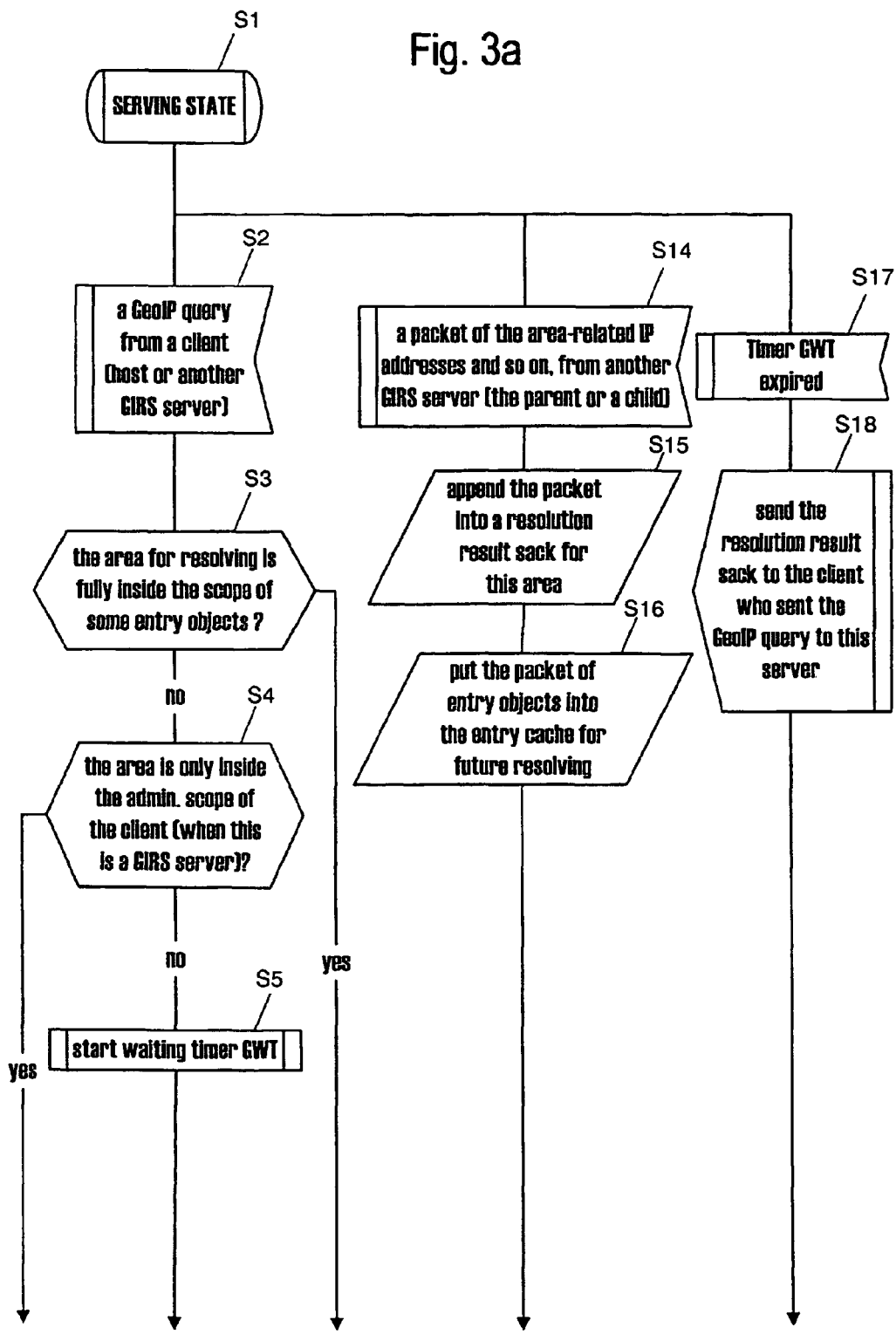

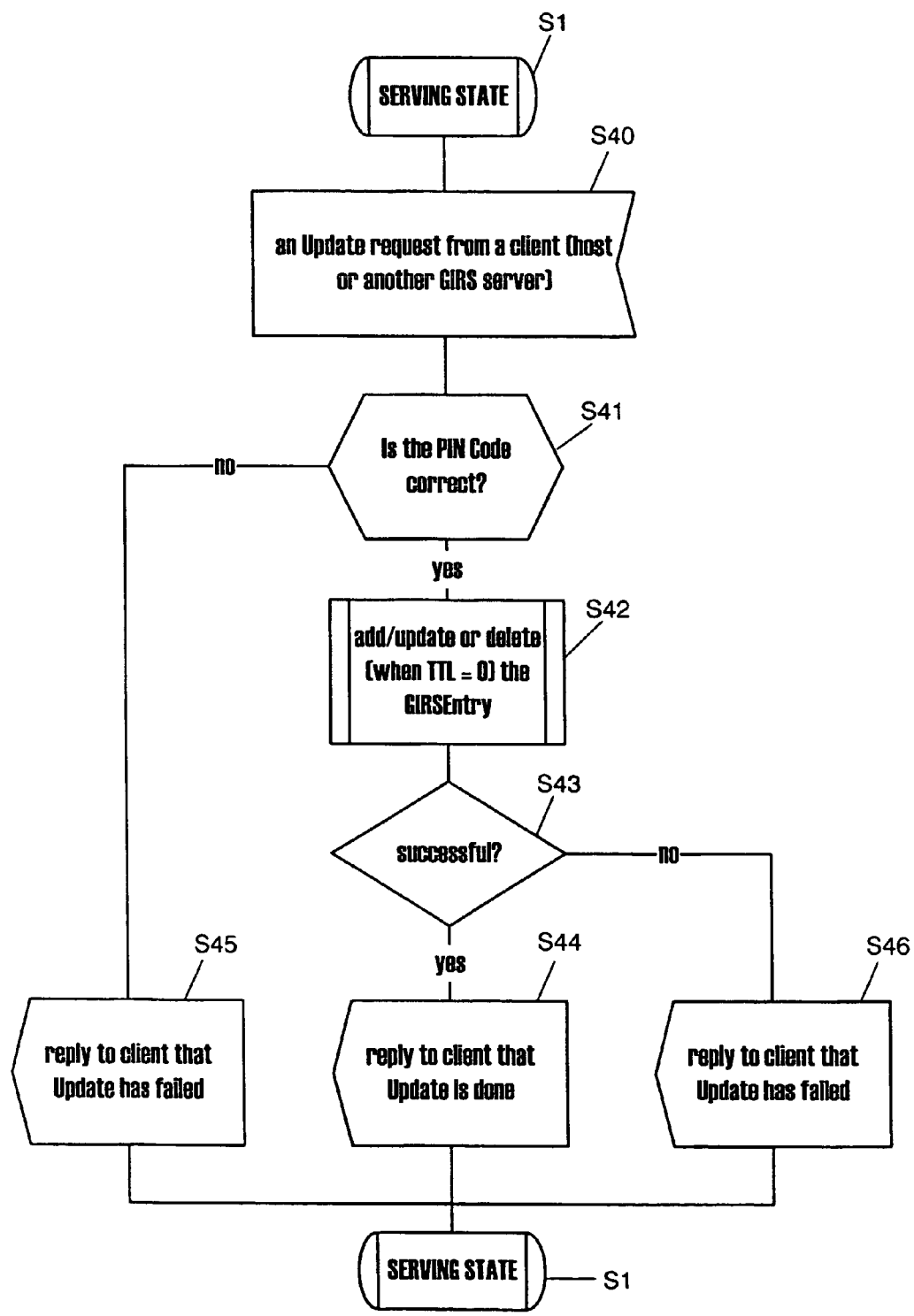

METHOD AND SYSTEM FOR RESOLVING BETWEEN GEOGRAPHIC INFORMATION AND NETWORK ADDRESSES IN A WIDE AREA NETWORK, PREFERABLY IN THE INTERNET

PRIORITY CLAIM

This is a national stage of PCT application No. PCT/EP00/00763, filed on Jan. 31, 2000. Priority is claimed on that application.

FIELD OF THE INVENTION

The invention relates to a system and method for resolving between geographic information and network addresses in a wide area network, in particular the internet.

BACKGROUND OF THE INVENTION

The resolving system presently used in the internet is the domain name system (DNS) which assigns a unique fixed numerical address (IP address, i.e. internet protocol address) to each server, host and/or access port for accessing the internet. This resolving system DNS is unable to indicate any details on the actual geographic position of the accessed server, or host.

SUMMARY OF THE INVENTION

The present invention aims at providing a system and method which are capable of increasing the usability of a wide area network, in particular the internet.

According to the invention, a plurality of dedicated servers are provided which store geographic data on the geographic position of the accessible servers, hosts and the like in correspondence to the logical or numerical addresses thereof. Thus, it is possible to correlate the addresses of the accessible hosts and the like to their actual geographic location. This geographic information is preferably designating the geographic coordinates (longitude, latitude and possibly altitude) of the location of the hosts and the like and is stored in the dedicated servers which are accessible by the other servers, hosts and the like of the wide area network, preferably a world wide network such as the internet. The present geo-address resolving system therefore extends the wide area network into a geo-aware network. This offers the possibility of dealing with requests of various location-based services in the wide area network (preferably internet, i.e. IP network) and thus will contribute to the further success of the internet, and will allow the wide area network to become a main platform for various forms of networking.

The proposed method and system provide a variety of advantages. First, one can resolve, by accessing one or more of the dedicated servers, a geographic area into the corresponding IP addresses of the servers, hosts and the like located in this area. For instance, it is now possible to find all servers which provides specific services in a certain geographic area. Furthermore, it is possible to find the hosts/access ports which are located in a certain geographic area and provide or request specific services. In addition, it is also possible to find all registered hosts inside a given geographic area.

Further, it is also possible to resolve a given address (for instance, an IP address) into the geographic location of its host or access port. Optionally, the service types provided or requested by the server or access port, its policy server as well as the administered geographical area (in case of being a dedicated server) can be recognized. These capabilities enable to get information on most of the location-based services, networking and lead to a performance improvement for the internet.

The invention can be added to the internet as a complementary function, without affecting any of the existing protocols, operations and capabilities of the wide area network which can furtheron be used in the customary manner. The dedicated servers are preferably simply formed by a dedicated web server dedicated for the geo-IP resolving services. Thus, the dedicated servers can be easily developed and deployed with very low costs. It is not necessary to effect any changes with regard to the DNS (domain name system) so that the stability and usability of this system remains untouched.

Preferably, the dedicated servers contain, in addition to the geographic location of the servers, hosts, and the like, one or more of the following additional information: the host name of the host (for instance, its domain name); service types the host/port can provide or accept; the policy server of the host/port; the geographic area (preferably a rectangular area) administered (covered) by the dedicated server; time information related to the cancelling of some entries in the dedicated server; and the like.

When accessing a dedicated server, same will preferably issue the stored additional information related to an indicated network address, and/or to the servers, hosts/or access ports located in the geographic area corresponding to an indicated geographic information. The accessing party can then easily decide whether, for instance, the provided or accepted service types are appropriate.

BRIEF DESCRIPTION OF THE FIGURES

FIG. 1 shows an example of several hierarchically arranged dedicated servers assigned to different and/or overlapping geographic areas;

FIG. 2 shows an example of the data flow from and to dedicated servers;

FIG. 5 shows a flow chart of an example of a process for updating the address in a dedicated server.

DETAILED DESCRIPTION OF A PREFERRED EMBODIMENTS OF THE INVENTION

Figure 3B:
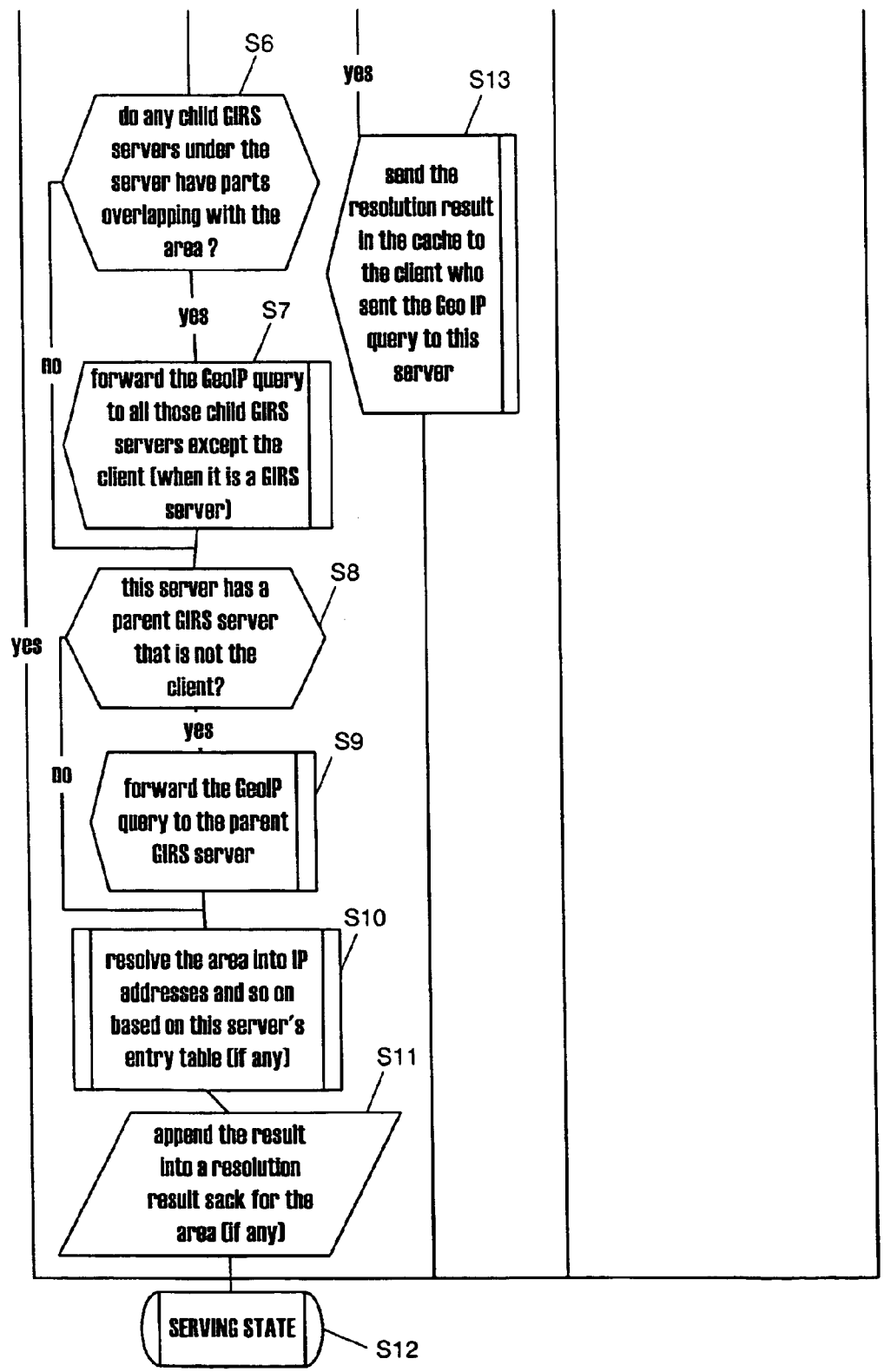
FIG. 3 shows a flow chart of a process for resolving an indicated geographic area into the IP addresses of servers and the like located in this geographic area.

FIG. 1 shows an embodiment of the hierarchical structure of the system according to the present invention. In the following, this system will be termed "GIRS" (Geo-IP Resolving System) and is a system which resolves between geographic information and the network addresses (in the present embodiment the IP (Internet Protocol) addresses) of the relevant hosts or access ports, optionally under the constraint of the service types provided or requested by some of those hosts/ports. The system therefore complements the network address resolution (IP address) with topological/geographic information.

As shown in FIG. 1, the GIRS system comprises a plurality of GIRS servers (dedicated servers) 1 which are arranged in a hierarchical structure. The GIRS servers 1 of the lowest level are designated by the added letters A, B and F. The GIRS servers of the next level are the servers C and E. Server D is situated on the next higher level. The structure can contain additional higher levels. Furthermore, each level normally comprises more than the shown number of GIRS servers 1.

Each GIRS server 1 is assigned to a certain geographic area which is smallest for the servers of the lowest level and increases for each higher level server in such a manner that the geographic scope (area) covered by a server of a higher level encompasses all geographic areas covered by all those GIRS servers of the adjoining lower level which are assigned to the respective higher level GIRS server. Hence, a tree-like structure results wherein two or more GIRS servers of a lower level are assigned to one GIRS server of the adjacent higher level (see FIG. 1). The lines connecting the GIRS servers of the different levels illustrate this parent-child-like relationship between the respective GIRS servers.

As shown in FIG. 1, GIRS server A covers the geographic area 2 which is termed and is preferably a rectangular area designated by the geographic coordinates of two diametrically opposing corners of the rectangle. GIRS server B covers the rectangular geographic area 3 ("Geo-area scope of B") which is partially overlapping with area 2 of GIRS server A. The geographic area covered by GIRS server C of the next higher level has the reference numeral 4 ("Geo-area scope of C") and encompasses both areas 2 and 3, as shown in FIG. 1.

In the example shown in FIG. 1, a case is considered where all IP addresses of servers/hosts/access ports situated in a certain geographic area 5 are to be found and listed. This area 5 is preferably designated by indicating the geographic coordinates of two diametrically opposing corners, similar to the designation of the areas 2 to 4, and is fully located within area 2 and partially overlapping with rectangular area 3, as well as, naturally, fully within area 4.

FIG. 1 schematically illustrates the information flow between the GIRS servers 1 of the individual levels by means of arrows. In this example, GIRS server F receives a request to resolve (output) the IP addresses of all servers/hosts geographically located within the rectangular area 5 designated by its coordinates. GIRS server F does not cover any part of the requested geographic area 5 and therefore hands over this request to its assigned GIRS server E of the next higher level. GIRS server E likewise detects that it does not cover the requested area 5 and therefore also hands over this request to is assigned GIRS server D of the next higher level. This GIRS server D is superordinate to GIRS server C and thus covers a wide area including area 4 and therefore area 5. GIRS server D therefore sends this request down to GIRS server C which in turn sends this request down to the GIRS servers A and B of the lowest level. The GIRS servers A and B collect the requested information and send it back along the same way as the request was handled, that is to GIRS server C→GIRS server D→GIRS server E→GIRS server F. This GIRS server F then outputs a response indicating all found IP addresses back to the inquiring server or host.

The GIRS servers of the lowest level of the hierarchical structure may be GIRS servers of autonomous systems (AS) and contain details on each host located in the area covered by the resepective GIRS server. Any GIRS server of a higher level such as GIRS servers C, D and E normally have a lower level of resolution and may contain data only with regard to the details of GIRS servers in the next lower level but not on any other host or the like.

Each GIRS server at least of the lowest level (servers A, B, F) handles a request for listing all servers/hosts/access ports within a certain geographic area by referring to an internal resolving table (database) wherein each entry (in the following called GIRSEntry) of the table preferably contains the information types shown in the following table 1.

TABLE 1

| Type | Description | Status |
|---|---|---|
| GeoInfo | The geographic position of a host or its access port in the form of a point (x, y, z), with $-90° \leq x \leq +90°/-180° \leq y \leq 180°/z$ (altitude in meters) | Mandatory |
| IP | The IP address of the host | Mandatory |
| HostName | The hostname of the host | Optional |
| ServiceType | Service types that the host/port can provide or accept, where '+' before a service type means to provide the service and '−' means to request the service, e.g., "+http + fpt + wwwHosting + GIRS-wwwMirroring" | Optional |
| PolicyServer | The policy server (IP/protocol/portNumber) of the host/port, e.g., 130.233.168.52/tcp/1111 | Optional |
| Area | The geographic rectangle area administrated by the GIRS server, represented by two points (e.g. ist north-west and south-east corners), valid only when this entry is of a GIRS server, i.e., with "+GIRS" | Mandatory only for a GIRS server |
| TTL | Time-to-leave of the entry, is effective only when the entry object is cached to another GIRS server or when removing an entry upon request of a provider | Mandatory |

Table 1 shows the information types contained in an entry (GIRSEntry) of the resolving table of a GIRS server provided in the form of a table, with added description and status indication. The information "GeoInfo" is mandatory and indicates the geographic position of a host or its access port in the form either of a two-dimensionally defined point (x, y), with x indicating the latitude coordinates and y designating the longitude coordinate. These coordinates may be detected by using a GPS (Global Positioning System), for instance. The GeoInfo information may preferably also represent the three dimensional coordinates of the respective point by additionally containing an information on the altitude of the respective host/access port (x, y, z). In this case, the altitude z is preferably indicated in an appropriate standard such as meters, whereas x and y indicate the latitudinal and longitudinal degree, respectively.

For an efficient resolution of any indicated geographic area (GeoArea), the information on the geographic position (GeoInfo) of each host or access port should be collected/accessed or updated by using a point quadtree algorithm (e.g. by the algorithm of Finkel/Bentley).

The next information "IP" contained in each GIRSEntry is mandatory and designates the IP address of the host. The GIRSEntry may additionally contain information on the host name of the host: "HostName" (optional). This name is normally the domain name given to the host.

A further information element of the entries of the resolving table is "Service type" which describes the types of services that the host or port can provide or accept. These service types preferably represent information on supported or requested protocol types such as "http" and "ftp", internet functionalities such as "wwwHosting", "wwwMirroring", "wwwProxy" and "wwwCache" describing the abilities to act as host or proxy server of the internet, or providing mirroring or cache functions for the internet or www (world wide web). A further information is "GIRS" describing the ability or non-ability of the host to act as GIRS server. Additional service types may easily added as required. Preferably, provided services are designated by a certain symbol such as "+" whereas services requested are characterized by adding a different symbol such as "−". The example mentioned in the row "service type" of Table 1 designates a host which provides protocol types "http" and "ftp", hosting function for the internet, is structured as a GIRS server but requests a mirroring service. This information element "service type" is preferably provided but may also be omitted and is therefore only optional.

Likewise, the next information element "PolicyServer" is preferably provided but basically optional and describes the policy server of the host/port, preferably by indicating the IP address, the requested protocol and the port number such as "130.233.168.52/tcp/1111". As known, the function and structure of a policy server consists in managing the network resources according to designed rules and downloading these rules to the network infrastructure (switches). Networks that consist of policy switches and policy servers are commonly called policy-based networks.

A next information element of the entries of the resolving table is "area" which defines the geographic rectangular area administrated (covered) by the GIRS server and is preferably represented by the geographic coordinates of the two diagonally opposite corners (for instance north-west and south-east corners). This information element is only necessary when the host described by this entry is actually a GIRS server. In other cases, this field is empty.

The further information element "TTL" contained in the resolving table entries designates the "time-to-leave", i.e. cancellation of an entry. This information element is effectively set only when this entry is cached to another GIRS server, or when the provider requests the removal of this entry. An entry cached from another GIRS server will be removed when its time specified by the "TTL" field has expired without any updating of the respective entry during the TTL period. A GIRSEntry provider can delete its GIRSEntry in its GIRS server by updating the GIRSEntry again but setting the TTL field to zero.

The access types (query/update) of a GIRS server 1 are shown in the following table 2.

TABLE 2

The access types of a GIRS server

| Access Type | Access Format | Response | Description |
|---|---|---|---|
| GeoIP | GeoArea. ServiceType | IP(s) PolicyServers(opt) | A GIRS server resolves the given geographic rectangular area and its interested service types into a set of the relevant IPs and, optionally, the IP/protocol/port of their policy servers if desired and valid. |
| IPGeo | IP address | GeoInfo ServiceType (opt) PolicyServer (opt) Area (opt) | A GIRS server resolves the given IP address into its GeoInfo, ServiceType (optional), PolicyServer (optional), and Area (only when the IP is for a GIRS server). |
| Update | GIRS Entry. PINCode | Success/Failure | An entry is added/updated in a GIRS server, where GIRS Entry is in the entry format of the resolving table of GIRS. PINCode is the authentication code of the entry provider. |

The access type "GeoIP" defines a desired geographic area, preferably a rectangular area, by designating the coordinates of opposite corners ("GeoArea") and may preferably additionally specify interesting service types provided or requested by servers/hosts/access ports existing in the designated geographic area ("Service Type"). This request causes an addressed GIRS server to select, from its resolving table, all servers/hosts/access ports which have geographic positions (GeoInfo) within the designated geographic area and which provide/request the designated service types. The GIRS server covering the designated geographic area responds to this request "GeoIP" by sending back the IP addresses of the selected servers/hosts/access ports, optionally accompanied by the additional information such as information on the policy servers assigned to the hosts represented by the IP addresses, and the like, when necessary or desired, and existing.

If the interesting geographic area (GeoArea) should not be rectangular, it is preferably approximated by several rectangles covering the interesting area which rectangles are then individually resolved and all found data are collected.

When no match should be found for a GeoIP query, the GIRS server replys by sending a response with empty fields. If only an optional field of the response is omitted, this field is left empty when responding.

A GIRS server can also be addressed by a command "IPGeo" wherein an IP address is sent to a GIRS server which responds by selecting, from its resolution table, the information contained in the entry corresponding to the indicated IP address. The GIRS server therefore resolves the given IP address to the geographic position (GeoInfo) and optionally the information on supported service types, the policy server and the covered area (when the IP address designates a GIRS server), and sends this information back to the requesting party, possibly via intermediate GIRS servers (see FIG. 1).

When a request "IPGeo" is issued and no match therefor can be found in any GIRS server, the resolving failure is reported by a GIRS server or DNS server. Preferably the type(s) of failure ("address not found"; "address not existing"; "no GeoInfo available"; or the like) is forwarded to the client.

A further access command for a GIRS server is an "Update" command requesting the addition or updating of an entry in the resolution table. The update command contains the information "GIRSEntry" which has the entry format of the resolving table such as shown in Table 1. For providing a certain level of security protection so as to guard the updating access to a GIRS server, an additional PIN code is used for authentication. This PIN code is contained in the updating command and is checked by the GIRS server for validity. Only if valid, the GIRS server effects the requested updating. The GIRS server sends a response to the requesting server/host indicating success or failure of the update.

A GIRS server is preferably accessed by HTTP protocol because of its wide availability in the internet. However, any other protocol can be selected.

Table 3 illustrates the authorization types of providers for providing entries for a dedicated server (GIRS server).

TABLE 3

The attributes of GIRSEntry providers.

| GIRSEntry Provider | Geo-Update Speed | IP Configuration | Description |
|---|---|---|---|
| Access Port Keeper | Static Slow Fast | DHCP StaticIPConfig MobileIP Care-of-addr. | An access port keeper is the one who provides accesses to an IP network, e.g., an ISP. It knows the location(s) of its access port through |

TABLE 3-continued

The attributes of GIRSEntry providers.

| GIRSEntry Provider | Geo-Update Speed | IP Configuration | Description |
| --- | --- | --- | --- |
| Any Host with its geo-information from GPS or other system | Static Slow Fast | DHCP StaticIPConfig MobileIP Care-of-addr. | GPS, ist cellular phone system, or other sources. In this case, a host itself provides its GIRSEntry to a G IRS server in ist scope |

Table 3 shows the attribute of the GIRSEntry providers. Basically, there are two groups of entry providers to the GIRS servers, namely access providers and the accessing host themselves. The access providers usually report all GIRSEntries related to their hosts and ports, whereas the hosts can report only their own GIRSEntries. For tracing a non-GIRS-speaking host, its access provider is addressed for giving further information on this host.

The IP address of a GIRS server can be found through the DNS server of its autonomous system (AS). Basically there are two ways to name a GIRS server. The first approach is based on extended RR of DNS, called SRV RR (see RFC 2050). One can then add the two DNS records of a GIRS server into its DNS server. The two DNS records have the forms shown in the following table 4 (see RFC 2025 for further details).

TABLE 4

| GIRS.HTTP.Domain | SRV | Pri. | Wei. | Port | Host.instituteName.parentDomainName |
| --- | --- | --- | --- | --- | --- |
| hostName.instituteName.parentDomainName | | | | A | IP address |

Table 4 shows the structure of DNS records in a DNS server used for finding a GIRS server.

Any hosts in the internet can easily find the name of the GIRS server by querying the DNS server with GIRS.HTTP-.Domain. In turn, they can resolve the IP address of the GIRS server by querying again the DNS server with the found name. This approach is preferably used for GIRS.

The second approach is based on the assumption that a consensus can be made on the naming of a GIRS server, for instance naming it as "GIRS.instituteName.parentDomainName". Then, any host can resolve the IP address of the GIRS server by sending only one query to the DNS server using the name of the GIRS server which is now known beforehand. This second approach is an easier alternative to the first approach.

As mentioned above, GIRS consist of a hierarchy of GIRS servers 1. The highest parent is the root server whereas the lowest children are the GIRS servers at AS level (level of the Autonomous System). The geographic areas covered by the GIRS servers can be overlapping. The GIRS system is advantageously built from the bottom and thus can even be used if no root GIRS server should be available for some time. In its final state, the complete GIRS hierarchy will have the levels of "root→country→state/province→city→AS".

FIG. 2 shows the data flow for processing an IPGeo Request in simplified form, the numberings of arrows signaling the step sequence. As first step, a GIRS server 7 receives an IPGeo query whereupon it sends a command (GIRS.HT-TP.DOMAIN) to a DNS server 6 requesting the name of the GIRS server 8 where "DOMAIN" is extracted from the IP address in the IPGeo query (step 2). The DNS server 6 sends the name of server 8 back to GIRS server 7 (step 3) which then requests DNS server 6 to resolve the name of server 8 (step 4). DNS server 6 responds by sending back the IP address of server 8 (step 5). The GIRS server 7 thereupon sends an IPGeo query to server 8 (step 6) which responds by sending back the requested GeoInfo information and so on (step 7). Server 7 finally replys to the inquiry of step 1 by sending back the GeoInfo information received from server 8 to the requesting client (step 8). The servers 7 and 8 can be any two arbitrary servers in the GIRS hierarchy.

FIG. 3 consists of FIGS. 3a and 3b which are to be combined by attaching the top of FIG. 3b to the bottom of FIG. 3a. FIG. 3 shows the procedure for processing a GeoIP request (resolve an indicated geographic area to IP addresses located in this area). The arrows shown in FIG. 1 graphically represent the information flow according to the procedure illustrated in FIG. 3.

Step S1 represents the normal serving state of the GIRS server. Step S2 represents the receipt of a GeoIP query from a client which may be a host or another GIRS server. The addressed GIRS server checks whether the indicated geographic area is fully inside the scope of its own entry objects (Step S3). If no, the process goes to step S4 wherein the GIRS server checks whether the indicated geographic area is inside the administrated scope of the client (when same is a GIRS server) but outside of its own covered geographic area. If the answer is yes, the addressed GIRS server has no information to send and enters again into the normal serving state (step S12) without sending results to the client. If the answer in step S4 is no, the GIRS server starts a waiting timer GWT (step S5) which sets a maximum time duration for sending back results to the client. Thereafter, the server checks (step S6) whether any child GIRS servers, that are GIRS servers at a lower level than the addressed GIRS server, cover geographic areas overlapping with the indicated geographic area. If yes, step S7 is conducted in order to forward the GeoIP query to all those child GIRS servers but not to the client (when same is a GIRS server). If the answer in step S6 is no, step S7 is omitted and the process flows to step S8 which is also conducted following step S7. In step S8, the addressed GIRS server checks whether it has a parent GIRS server which did not send the GeoIP request, that is not the client. If yes, the GeoIP query is also forwarded upwards to the parent GIRS server (step S9) which step is otherwise omitted when the answer in step S8 is no. The process then proceeds to step S10 where the indicated geographic area is resolved into the IP addresses and so on based on the addressed servers entry table (if any). This result (if any) is appended to a resolution result sack containing all results found for the indicated geographic area. Thereupon, the serving state is again entered (step S12). The sack is the name for the set of IP addresses as well as, possibly, the IP address, transport protocol, and transport port number of their associated policy server of the resolved IP addresses. The sack is filled with those resolved information from one or more GIRS servers.

When the answer in step S3 is yes, the process proceeds to step S13 where the resolution result contained in the cache is immediately sent to the client who issued the GeoIP query to this GIRS server. Thereupon, the serving state S12 is entered.

In step S14, any response to the forwarding of GeoIP queries in step S7 and S9 is received in the form of a packet of IP addresses and so on related to the indicated geographic area which package comes from parent and/or child GIRS servers. The received package is appended to the resolution result sack (step S15) and is also stored in the entry cache of the receiving GIRS server for future resolving. Thereupon, the serving state S12 is again entered. Step S17 supervises the expiry of the timer GWT. If expiry of the timer is detected, the procedure proceeds to step S18 where the resolution result sack is sent to the client to issued the GeoIP query to this GIRS server. Thus, the process has sufficient time for collecting all necessary area resolution information from other GIRS servers covering the indicated geographic area. Still, the timer ensures that upon expiry of the set time interval, all found resolutions are sent back, and the GeoIP query is treated as complete.

Figure 4:
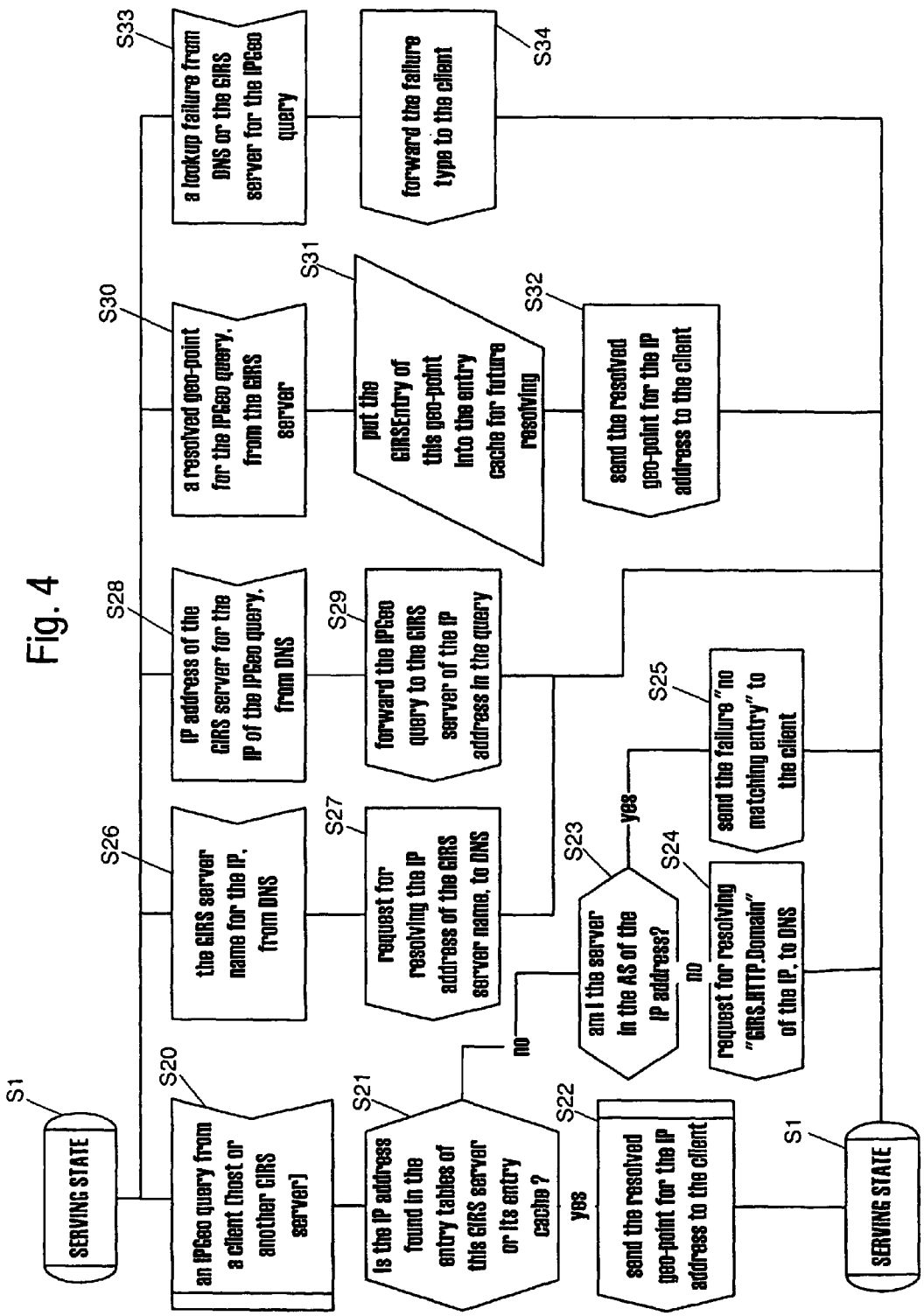
FIG. 4 shows a flow chart of an example of a process for resolving an indicated IP address into information on the geographic location of the server having this IP address.

FIG. 4 illustrates the procedure for resolving an indicated IP address to a geographic point (position of the host having this IP address), that is the handling of an IPGeo command. FIG. 2 graphically shows the information flow according to FIG. 4.

When an IPGeo query is received from a client which may be a host or another GIRS server (step S20), the addressed GIRS server checks its own table and its entry cache with regard to this IP address (step S21). If an entry is found, the GIRS server sends the result geo-point, that is the geographic coordinates for the indicated IP address to the client (step S22) and then enters again the serving state S1. If the answer in step S21 is no, the addressed GIRS server checks, in step S23, whether it is the server in the autonomous system to which the IP address belongs. If yes, the GIRS server is the GIRS server on the lowest level and therefore sends, in step S25, the failure information "no matching entry" to the client. Otherwise, the server proceeds to step S24 and sends a request for resolving "GIRS.HTTP.Domain" to the IP address, to the domain name system DNS. The GIRS server should then receive, in step S26, the name of the GIRS server in charge of the indicated IP address from the domain name system (DNS), and sends a new request for resolving the IP address of the GIRS server name to the domain name system (step S27) whereupon it again enters the serving state. Subsequently, the GIRS server will receive, in step S28, an answer from the domain name system indicating the IP address of the GIRS server for the IP address indicated in the IPGeo query. The GIRS server now forwards, in step S29, the IPGeo query to the found GIRS server designated by the domain name system. Thereafter, the GIRS server will receive, in step S30, the geographic coordinates for the IP address indicated in the IPGeo query, from the GIRS server addressed in step S29. The information received in step S30 is entered, as a GIRSEntry for this geographic point and IP address (possibly with associated Service Type, Policy Server, Area), into the entry cache for future resolving (step S31), and is also sent to the client as answer (geographic coordinates of the indicated IP address and possibly the others mentioned above; step S32).

If the GIRS server should receive a failure indication instead of the information requested in step S27, S28 or S30, it inputs this failure information in step S33, and forwards information on the type of failure to the client (step S34). The query is then treated as settled and the serving state is again entered.

FIG. 5 shows the procedure for adding, updating or deleting a GIRSEntry from/of a client inside the administrative scope (geographic area) of this server. Step S40 represents the receipt of an update request from a client which may be a host or another GIRS server. For security reasons, the addressed GIRS server first conducts an authorization check by examining the correctness of a PIN code added to the update request (step S41). If the PIN code is incorrect, the process proceeds to step S45 and sends a reply to the client indicating that the update has failed and/or the PIN code was incorrect. If the authorization check is successful, the process proceeds to step S42. The addressed GIRS server processes the update request and adds, updates or deletes (when TTL is set to zero) the specified GIRSEntry as required. Thereafter, the procedure checks, in step S43, whether the update was successful. If yes, the GIRS server sends a reply to the client indicating the successful update (step S44). Otherwise, a reply is sent to the client informing same that the update has failed (step S46). Thereafter, the serving state S1 is again entered.

Generally, the described GIRS system is used for an internet service provider (ISP), an autonomous system (AS) and/or a host to present its geo-based services or service requests to the internet for the purpose of providing/locating/receiving location-based services.

A further advantage of this chosen structure is that other operations of a domain or across domains will not be affected by whether or not a GIRS server exists in some of the domains.

For reducing the network and GIRS server load, the time interval of updating the GIRS entries should be rather long. However, in case of tracking fast moving mobile hosts, the time interval can also be shortened to increase the location accuracy.

Although a cache is not necessarily required in a GIRS server, the provision of such an entry cache will reduce the response delay for a query at least statistically. The response delay will be further reduced by increasing the size of the entry cache.

What is claimed is:

1. A system, comprising:
    a plurality of servers configured to store databases which comprise information including network addresses and corresponding geographic location of at least one of other servers, hosts, and access ports accessing a wide area network,
    wherein said servers are addressable by at least one of another server, host, and access port by inputting geographic location information or a network address,
    wherein said servers are configured to determine one of geographic location and network addresses, of the at least one of the other servers, hosts, and access ports when provided with the other of geographic location and network addresses of the at least one of the other servers, hosts, and access ports, and
    wherein said servers are configured to output network address information for the at least one of the other servers, hosts, and access ports located in a geographic area corresponding to the input geographic location information, or to output information including the geographic location of the another server, host, or access port corresponding to the indicated input network address.

2. The system according to claim 1, wherein the databases stored in said servers further comprise additional information including a domain name of the at least one of the other servers, hosts, and access ports, said servers being configured to output when being addressed from at least one of another server, host, and access port, the domain name and the information including the geographic area corresponding to the input network address.

3. The system according to claim 1, wherein the databases stored in said servers further comprise additional information including a service provided or requested by the at least one of the other servers, hosts, and access ports, said servers being addressable from at least one of another server, host, and access port, and configured to output information including the service provided or requested by the at least one of the other servers, hosts, and access ports.

4. The system according to claim 1, wherein the databases stored in said servers further comprise additional information including a policy server of the at least one of the other servers, hosts, and access ports, said servers being configured to output, when being addressed from at least one of another server, host and access port, the additional information on the policy server of the at least one of the other servers, hosts, and access ports.

5. The system according to claim 1, wherein the databases stored in said servers further comprise additional information including a geographic area administered by the respective one of said servers including the respective database.

6. The system according to claim 1, wherein the databases stored in said servers further comprise additional time-related information for automatically removing entries in the respective database after expiry of an indicated time interval.

7. The system according to claim 1, wherein the network addresses are a packet data address, an internet protocol address, an internet protocol address and a port number, a domain name, an internet unified resource locator, or another network resource identifier.

8. The system according to claim 1, wherein said servers are hierarchically arranged and superordinate ones of said cover at least partially geographic areas of at least two of respective subordinate ones of said servers.

9. A method, comprising:
providing a plurality of servers which store databases comprising information including network addresses and corresponding geographic location of at least one of other servers, hosts, and access ports for accessing a wide area network;
receiving, by a first addressed server, a search request for determining one of geographic location and network addresses of the at least one of other servers, hosts, and access ports, the search request including the other of geographic location and network addresses of the at least one of the other servers, hosts, and access ports;
collecting data for determining the one of geographic location and network addresses of the at least one of the other servers, hosts, and access ports;
determining one of geographic location and network addresses, of the at least one of the other servers, hosts, and access ports when provided with the other of geographic location and network addresses of the at least one of the other servers, hosts, and access ports; and
outputting, by the first addressed server, network address information for the at least one of the other servers, hosts, and access ports located in a geographic area corresponding to the input geographic information, or outputting information including the geographic location of the another server, host, or access port corresponding to the input network address.

10. The method according to claim 9, wherein the databases stored in the servers further comprise additional information including a domain name of at least one of the other servers, hosts, and access ports, said servers outputting, when addressed from at least one of another server, host, and access port, the domain name and information including the geographic area corresponding to the indicated input network address.

11. The method according to claim 9, wherein the databases stored in the servers further comprise additional information including a service at least one of the other servers, hosts, and access ports provide or request, said servers outputting, when respectively addressed, the additional information including the service the at least one of the other servers, hosts and/or access ports provide or request.

12. The method according to claim 9, wherein the databases stored in the servers further comprise additional information including a policy server of at least one of another server, host, and access port, said servers outputting, when respectively addressed from at least one of another server, host, and access port, the stored additional information including the policy server of the at least one of another server, host, and access port.

13. The method according to claim 9, wherein the databases stored in the servers further comprise additional information on a geographic area administered by the respective server containing the respective database.

14. The method according to claim 9, wherein the databases stored in the servers further comprise additional time-related information for automatically removing servers in the respective database after expiry of an indicated time interval.

15. The method according to claim 9, wherein the databases stored in the servers can be updated by a host or other server by adding, updating or deleting one or more entries in a respective entity.

16. The method according to claim 15, wherein a server effects an authorization check before actually updating its database when receiving an updating command.

17. The method according to claim 9, wherein the network addresses comprise a packet data address, an internet protocol address, an internet protocol address and a port number, a domain name, an internet unified resource, or another network resource identifier.

18. The method according to claim 9, wherein the servers are hierarchically arranged and superordinate ones of the servers cover at least partially geographic areas of at least two of respective subordinate ones of the servers, said method further comprising:
starting a search with the first addressed server;
handing over the search request to a superordinate server when the input geographic region or network address is at least partially outside its covered range;
sending, by the superordinate server, this search request to at least one further superordinate server or to at least one other subordinate server for data collection;
sending all collected data to the first addressed server; and
sending, by the first addressed server, all collected data as an answer to the search.

19. An apparatus comprising:
a memory configured to store databases which comprise information including network addresses and corresponding geographic location of at least one of other servers, hosts, and access ports for accessing a wide area network,
wherein the apparatus is addressable by at least one of another server, host, and access port by inputting geographic location information or a network address,
wherein the apparatus is configured to determine one of geographic location and network addresses, of the at least one of the other servers, hosts, and access ports when provided with the other of geographic location and network addresses of the at least one of the other servers, hosts, and access ports, and wherein the apparatus is configured to output network address information for the at least one of the other servers, hosts, and access ports located in a geographic area corresponding to the input geographic location information, or to output information including the geographic location of the another server, host, or access port corresponding to the indicated input network address.

20. The apparatus according to claim 19, wherein the databases stored in said apparatus further comprise additional information including a domain name of the at least one of the other servers, hosts, and access ports, said apparatus being configured to output when being addressed from at least one of another server, host, and access port, the domain name and the information including the geographic area corresponding to the input network address.

21. The apparatus according to claim 19, wherein the databases stored in said apparatus further comprise additional information including a service provided or requested by the at least one of the other servers, hosts, and access ports, said apparatus being addressable from at least one of another server, host, and access port, and configured to output information including the service provided or requested by the at least one of the other servers, hosts, and access ports.

22. The apparatus according to claim 19, wherein the databases stored in said apparatus further comprise additional information including a policy server of the at least one of the other servers, hosts, and access ports, said apparatus being configured to output, when being addressed from at least one of another server, host and access port, the additional information on the policy server of the at least one of the other servers, hosts, and access ports.

* * * * *